(12) United States Patent
Allen, Jr. et al.

(10) Patent No.: US 6,219,348 B1
(45) Date of Patent: *Apr. 17, 2001

(54) ATM-BASED DISTRIBUTED VIRTUAL TANDEM SWITCHING SYSTEM

(75) Inventors: George C. Allen, Jr.; Haifeng Bi; Steven R. Partridge; Samuel Sigarto; Richard W. Stephenson, all of Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/562,725

(22) Filed: May 1, 2000

Related U.S. Application Data

(63) Continuation of application No. 09/287,092, filed on Apr. 7, 1999.
(60) Provisional application No. 60/083,640, filed on Apr. 30, 1998.

(51) Int. Cl.[7] .................................................. H04L 12/66
(52) U.S. Cl. .......................... 370/354; 370/397; 370/467; 379/220
(58) Field of Search .................................... 370/352, 353, 370/354, 384, 385, 389, 395, 396, 397, 409, 524, 466, 467; 379/219, 220, 230

(56) References Cited

U.S. PATENT DOCUMENTS

| | | | |
|---|---|---|---|
| 5,260,978 | * | 11/1993 | Fleischer et al. . |
| 5,363,369 | * | 11/1994 | Hemmady et al. . |
| 5,392,402 | * | 2/1995 | Robrock, II . |
| 5,434,853 | * | 7/1995 | Hemmady et al. . |
| 5,434,854 | * | 7/1995 | Focarile et al. . |
| 5,438,565 | * | 8/1995 | Hemmady et al. . |
| 5,459,722 | * | 10/1995 | Sherif . |
| 5,483,527 | * | 1/1996 | Doshi et al. . |
| 5,513,174 | * | 4/1996 | Punj . |
| 5,568,475 | | 10/1996 | Doshi et al. . |
| 5,581,551 | * | 12/1996 | Fundneider et al. . |
| 5,619,500 | * | 4/1997 | Heikali . |

(List continued on next page.)

OTHER PUBLICATIONS

Malik, O., "It's the Voice, Stupid", Forbes, Digital Tool, Sep. 8, 1999.*
ATM Forum Technical Committee, "Circuit Emulation Service Interoperability Specification", Version 2.0, published Jan., 1997.*
ATM Forum Technical Committee, "Voice and Telephony Over ATM–ATM Trunking Using AAL1 for Narrowband Services", Version 1.0, published Jul., 1997.*

*Primary Examiner*—Huy D. Vu
*Assistant Examiner*—Kevin C. Harper
(74) *Attorney, Agent, or Firm*—Greenblum & Bernstein P.L.C.

(57) ABSTRACT

An Asynchronous Transfer Mode (ATM)-based distributed virtual tandem switching system is provided in which a network of ATM-based devices is combined to create a distributed virtual tandem switch. The system includes an ATM switching network that dynamically sets up individual switched virtual connections. The system also includes a trunk interworking function (T-IWF) device and a centralized control and signaling interworking finction (CS-IWF) device. The trunk interworking function device converts end office voice trunks from TDM channels to ATM cells by employing a structured circuit emulation service. The centralized control and signaling interworking function device performs call control functions and interfaces narrowband signaling and broadband signaling for call processing and control within the ATM switching network. Consequently, the ATM based distributed virtual tandem switching system replaces a standard tandem switch in the PSTN.

47 Claims, 7 Drawing Sheets

U.S. PATENT DOCUMENTS

| | | |
|---|---|---|
| 5,623,491 | 4/1997 | Skoog . |
| 5,638,365 * | 6/1997 | Duault et al. . |
| 5,703,876 | 12/1997 | Christie . |
| 5,710,769 * | 1/1998 | Anderson et al. . |
| 5,719,863 | 2/1998 | Hummel . |
| 5,757,783 * | 5/1998 | Eng et al. . |
| 5,867,571 | 2/1999 | Borchering . |
| 5,883,893 | 3/1999 | Rumer et al. . |
| 5,914,956 | 6/1999 | Williams . |
| 5,943,321 * | 8/1999 | St-Hilaire et al. . |
| 5,953,316 * | 9/1999 | Lazar et al. . |
| 5,956,334 * | 9/1999 | Chu et al. . |
| 5,991,301 * | 11/1999 | Christie . |
| 6,009,100 * | 12/1999 | Gausmann et al. .................. 370/397 |

\* cited by examiner

ATM-BASED DISTRIBUTED VIRTUAL TANDEM SWITCHING SYSTEM

This is a continuation of U.S. patent application Ser. No. 09/287,092, filed Apr. 7, 1999, the contents of which are expressly incorporated by reference herein in its entirety.

CROSS-REFERENCE TO RELATED APPLICATION

This application claims the benefit of U.S. Provisional Patent Application No. 60/083,640 filed on Apr. 30, 1998, entitled "ATM-Based Distributed Virtual Tandem Switching System" to ALLEN et al., the disclosure of which is expressly incorporated herein by reference in its entirety.

BACKGROUND OF THE INVENTION

1. Field of the Invention

The present invention relates to a telecommunications architecture. More particularly, the present invention relates to tandem switching systems for use within a public switched telephone network (PSTN). The present invention enables voice trunking over an asynchronous transfer mode (ATM) network by replacing tandem switches with a distributed virtual tandem switching system that includes a high speed ATM network. The replacement is virtual because as far as the end offices are concerned, the ATM-based distributed virtual tandem switching system is functionally equivalent to the traditional time division multiplexed (TDM) tandem switching system.

2. Background Information

Within the public switched telephone network (PSTN), an originating caller communicates with a destination by establishing a connection between an end office serving the originating caller and an end office serving the destination. FIG. 1 shows the architecture of the current PSTN. In today's PSTN, end office switches 10 are connected to each other via tandem trunk groups 12, direct trunk groups 14, or both tandem trunk groups 12 and direct trunk groups 14. Each trunk within a trunk group is typically a digital service level 0 (DS0) (i.e., 64 kilobits per second) communication line that transmits between the end offices 10 in a time division multiplexed (TDM) manner. When an end office utilizes a direct trunk group 14, the connection between the end offices 10 is without any intermediaries. When an end/central office 10 utilizes a tandem trunk group 12, the connection between end offices 10 is via a tandem switch 16.

The tandem switch or office 16 is an intermediate switch or connection, between an originating telephone call location and the final destination of the call, which passes the call along. Tandem switches are often utilized to handle overflow calls. That is, when all paths are busy on a primary route, e.g., the direct interoffice trunk group 14 between the originating and destination end offices 10, alternative routes through the tandem switch 16 handle the overflow call volume. The tandem switch 16 can also function as a physical path to non-directly-connected offices in addition to functioning as an overflow path for directly connected offices. If the overflow route through the tandem switch 16 becomes full, an alternate final route may be provided. The alternate final route is via another end office 10, thus employing two interoffice trunk groups 14.

Signaling is needed within the PSTN to establish a connection (i.e., setup a telephone call) between a calling party and a destination. The signaling enables line acquisition and sets up call routing, in addition to performing other functions. The signaling can be transmitted through a channel common with the voice data (in-band signaling) or can be transmitted through a dedicated channel (out of band signaling). The dominant signaling protocol currently in use today is transmitted via the dedicated channel and is called Signaling System 7 (SS7).

A conventional connection setup between two end offices 20, 22 in a tandem network is now described with reference to FIGS. 2 and 3. When a calling party 19 (e.g., 235-1111) dials a telephone number (e.g., 676-2222), the originating central office 20 interprets the dialed digits and routes the call to either a direct interoffice trunk group 14 between end offices 20, 22 or a pair of tandem office trunk groups 12 and the corresponding tandem switch 16 between end offices 20, 22. Assuming the pair of tandem office trunk groups 12 and the corresponding tandem switch 16 is utilized, a trunk from each of the trunk groups 12 needs to be selected and reserved by signaling within the SS7 network. Thus, necessary information is transmitted from the originating end office 20 to its associated signaling transfer point 18. Although only a single signaling transfer point is shown in the figures, a network typically includes many signaling transfer points. Thus, each signaling transfer point 18 transfers signals from one signaling link to another signaling link in the SS7 network that transports SS7 messages.

The transmitted information is in the form of an ISUP (ISDN user part) message. It contains a unique point code, which uniquely identifies each end office, corresponding to the originating end office (originating point code (OPC)) and the destination (destination point code (DPC)). Because the message must first go to the tandem office 16, the ISUP message contains the destination point code of the tandem office. The message also contains a circuit identification code (CIC) that corresponds to the physical circuit that will be employed to transport the data. Thus, interoffice trunks are identified by originating point code (OPC), destination point code (DPC), and circuit identification code (CIC).

As shown in the example illustrated in FIG. 3, initially an ISUP message is sent containing a DPC equal to 246 1 2, an OPC equal to 246 1 1, and a CIC equal to 22. Consequently, a circuit will be setup between the originating end office 20 and the tandem office 16. The tandem switch 16 receives the SS7 message and determines from the called number, which is embedded in the protocol, where to route the call, i.e., the appropriate destination end office 22. Then, via the SS7 network, the call is setup between the tandem switch 16 and the appropriate terminating office 22 in a similar manner. Thus, because the tandem office 16 needs to transport the data to the destination end office 22, the tandem office 16 sends an ISUP message to the signaling transfer point 18, including the destination end office=s destination point code, i.e., 246 1 3, the tandem office's origination point code, i.e., 246 1 2, and the circuit identification code corresponding to the circuit between the tandem office 16 and the destination office 20, e.g., circuit 7. After this ISUP message is sent to the signaling transfer point 18, the signaling transfer point 18 forwards the ISUP message to the destination end office 22 in order to setup the connection between the tandem office 16 and the destination office 22, thus reserving the circuit. The terminating central office switch 22 receives the SS7 message and determines where to terminate the call by interpreting the called number embedded in the protocol.

A call flow scenario is now described with reference to FIG. 2. A caller 19 dials the telephone number of a destination 23. The first end office 20 (end office A) collects the digits of the called number and checks routing tables to determine to which end office 22 the dialed telephone number belongs. Then the originating end office 20 finds a direct trunk group 14 between itself and the end office owning the dialed telephone number. Subsequently, the originating end office finds an idle trunk within the trunk group 14. The originating end office 20 selects and reserves the idle trunk of the trunk group 14 and initiates an SS7 IAM (initial address message) message containing the following: signaling transfer point routing address of the destination end office; the calling telephone number; the called telephone number, and the trunk ID (CIC) for the selected trunk of the trunk group.

The signaling transfer point 18 receives the IAM message and forwards it to the destination end office 22. The destination end office 22 then receives the IAM message and uses the CIC information to reserve the selected trunk within the trunk group 14. The destination end office 20 (end office B) then checks the called telephone number 23 for on-hook and feature support and holds the line, assuming the dialed telephone number is on hook. The destination end office 22 then applies a ring to the line and ring tone to the selected trunk in the trunk group 14. Next, the destination end office 22 connects the dialed telephone number line to the selected trunk in the trunk group 14, initiates an SS7 ACM (Address Complete Message) message and forwards it to the signaling transfer point 18.

The signaling transfer point receives the ACM message and forwards it to the originating end office 20 that receives the ACM message. The originating end office 20 then connects the calling telephone number line to the selected trunk. Consequently, the caller of the calling number hears a ring tone and the called party at the called telephone number picks up the phone. The destination end office 22 detects the off hook on the called telephone number 23 and removes the ring tone. The destination end office 22 then initiates an SS7 ANM (answer) message to the signaling transfer point 18. The signaling transfer point 18 receives the ANM message and forwards it to the originating end office 20. The originating end office 20 receives the ANM message and starts necessary billing measurement. Ultimately, the caller speaks with the called party.

Another call flow scenario according to the prior art is now described with reference to FIG. 2. Initially, a caller, e.g., 235-1111 dials a destination, e.g., 676-2222. The originating end office 20 (end office A) collects digits of the called number and checks routing tables to determine which end office handles 676. The originating end office 20 finds that 676 belongs to a destination end office 22 (end office B). End office A then locates a direct trunk group 14 to end office B. Assume in this example that no idle trunk exist within the direct trunk group 14. Thus, end office A chooses and reserves a first tandem trunk group 12, and a selected trunk from the first reserved trunk group 12. Subsequently, end office A initiates an SS7 IAM message containing the following: signaling transfer point routing address of the tandem; calling telephone number; called telephone number; and trunk identification (CIC) for the selected trunk of the first reserved trunk group 12.

The signaling transfer point 18 receives the IAM message and forward it to the tandem switch 16. The tandem office 16 receives the IAM message and utilizes the CIC information to reserve the selected trunk of the first reserved trunk group 12. The tandem office 16 then checks a routing table to determine the destination and reserves a selected trunk of a second trunk group 12, which connects to the destination. Subsequently, the tandem 16 initiates an SS7 IAM message to the signaling transfer point 18 with the following information: signaling transfer point routing address of end office B; calling telephone number; called telephone number; and trunk identification (CIC) for the selected trunk of the second trunk group 12.

The signaling transfer point 18 receives the IAM message and forwards it to end office B. End office B receives the IAM message and utilizes the CIC information to reserve the selected trunk of the second trunk group 12. End office B checks whether the called telephone number is on-hook and holds the line, assuming that 676-2222 is on-hook. End office B applies ringing to the line and a ring tone to the selected trunk of the second trunk group 12. End office B then connects the line to the selected trunk of the second trunk group 12 and initiates an SS7 ACM message to the signaling transfer point 18.

The signaling transfer point 18 receives the ACM message and forward it to the tandem switch 16. The tandem switch 16 receives the ACM message from the signaling transfer point 18 and consequently, the tandem switch initiates an ACM message to the signaling transfer point 18.

The signaling transfer point 18 receives the ACM message and forwards it to end office A. End office A receives the ACM message and connects 235-1111 to the selected trunk of the first reserved trunk group 12. Next, the caller at 235-1111 hears a ring tone and the called party at 676-2222 picks up the phone.

Consequently, end office B detects an off-hook on 676-2222. Accordingly, end office B removes the ring tone and initiates an ANM message to the signaling transfer point 18. The signaling transfer point 18 receives the ANM message and forwards it to the tandem switch 16. The tandem switch 16 receives the ANM message from the signaling transfer point 18 and the tandem switch 16 initiates an ANM message to the signaling transfer point 18.

The signaling transfer point 18 receives the ANM message from the tandem switch and forwards it to end office A. End office A receives the ANM message from the signaling transfer point 18 and starts necessary billing measurement. Finally, the calling party at 235-1111 talks to the called party at 676-2222.

The current system has disadvantages. In order to minimize overflow call volume, the size of a trunk group needs to be forecast so that the trunk group can handle the expected call volume. Then, appropriately sized trunk groups are preprovisioned, each having a dedicated bandwidth. The process of forecasting and preprovisioning is expensive. Moreover, the current trunking architecture requires a large number of small trunk groups to link end offices because of the large number of end offices that each end office must connect with. This form of trunking leads to inefficiencies due to the relatively small size of a significant number of the trunk groups. That is, the small size reduces the call carrying capacity per trunk and therefore requires a larger percentage of overflow trunking. In addition, the large number of trunk groups requires huge investments in hardware and software for systems that keep track of individual interoffice trunks. Further, the trunk forecasting and provisioning is necessary for thousands of individual trunk groups.

The ATM Forum's VTOA Group has attempted to solve the problems associated with voice trunking over ATM. The VTOA Group developed a specification for carrying voice over ATM in a private network environment. For example, see ATM Forum Technical Committee, "Circuit Emulation Service Interoperability Specification Version 2.0" (January 1997). That specification allows private businesses to employ an ATM network to establish voice channels across the ATM network using a protocol, such as private network-network interface (PNNI), which facilitates moving cells from one point in the ATM network to another point in the ATM network. However, the specification is limited to application within a private environment, which is not appropriate for applications in the PSTN. That is, interaction is not supported with systems that include out-of-band signaling, e.g., Signaling System 7 (SS7), which is essential to supporting capabilities such as an advanced intelligent network (AIN).

Within these private networks, the signaling is typically in-band signaling. Thus, no interface with an out-of-band signaling network would be required. Moreover, if a calling party within the private network would like to contact someone outside of the private network, the calling party must communicate over the normal PSTN, thus leaving the scope of the VTOA Group's system.

U.S. Pat. No. 5,483,527 addresses voice trunking within the PSTN. The patent discloses a system that interposes an ATM network between two central offices. Signaling is sent from the central office via a signaling transfer point (STP) to the ATM switch. Within each ATM switch, a processing system is provided for interfacing the ATM switch with the STP. Thus, the ATM switches are modified to be able to communicate with the signaling transfer point, which is a very expensive process. Furthermore, due to the interface being provided within each ATM switch, the path across the ATM network is established relatively slowly. Finally, the distributed placement of the interface between the signaling transfer points and the ATM network has its own disadvantages.

Glossary of Acronyms

| | |
|---|---|
| AAL | ATM Adaptation Layer |
| ACM | Address Complete Message |
| ADPCM | Adaptive Differential Pulse Code Modulation |
| ADSL | Asymmetric Digital Subscriber Line |
| AIN | Advanced Intelligent Network |
| ANM | Answer Message |
| ANSI | American National Standards Institute |
| ATM | Asynchronous Transfer Mode |
| B-ISUP | Broadband ISDN User Part |
| CAS | Channel Associated Signaling |
| CBR | Constant Bit Rate |
| CCS | Common Channel Signaling |
| CES | Circuit Emulation Service |
| CIC | Circuit Identification Code |
| CS-IWF | Control and Signaling Interworking Function |
| DPC | Destination Point Code |
| DS0 | Digital Signal Level 0 (64 Kbps digital signal format) |
| DS1 | Digital Signal Level 1 (1.544 Mbps digital signal format) |
| IAM | Initial Address Message |
| IP | Internet Protocol |
| ISDN | Integrated Service Digital Network |
| ISUP | ISDN User Part |
| ITU-T | International Telecommunications Union - Telecommunications |
| IWF | Interworking Function |
| IXC | Interexchange Carrier |
| OAM&P | Operations, Administration, Maintenance, and Provisioning |
| OC12 | Optical Carrier level 12 signal (622 Mbps) |
| OC3 | Optical Carrier level 3 signal (155 Mbps) |
| OPC | Originating Point Code |
| PCM | Pulse Code Modulation |
| PNNI | Private Network-Network Interface |
| POTS | Plain Old Telephone Service |
| PSTN | Public Switched Telephone Network |
| SS7 | Signaling System 7 |
| SSP | Service Switching Point |
| STP | Signal Transfer Point |
| SVC | Switched Virtual Connection |
| TDM | Time Division Multiplexing |

-continued

Glossary of Acronyms

| | |
|---|---|
| T-IWF | Trunk Interworking Function |
| UNI | User-to-Network Interface |
| VTOA | Voice and Telephony over ATM |

SUMMARY OF THE INVENTION

In view of the foregoing, the present invention is directed to providing a replacement for the current trunking system operating between end offices, as well as between end offices and an interexchange carrier network.

Accordingly, an Asynchronous Transfer Mode (ATM) based distributed virtual tandem switching system is provided. The system comprises an ATM switching network, a trunk interworking function (T-IWF) device, and a centralized control and signaling interworking function (CS-IWF) device. The trunk interworking function (T-IWF) device is adapted to receive end office voice trunks from time division multiplexed (TDM) channels and convert the trunks to ATM cells. The centralized control and signaling interworking function (CS-IWF) device performs call control functions and is adapted to interface narrowband and broadband signaling for call processing and control within the ATM switching network. Thus, the ATM based distributed virtual tandem switching system replaces a standard tandem switch.

According to a preferred embodiment, the T-IWF includes a circuit emulation service. Further, the T-IWF can include ATM adaptation layer 1 (AAL1). Alternatively, the T-IWF adapts circuit traffic to ATM cells utilizing ATM adaptation layer 2 (AAL2). If AAL2 is employed, silence suppression and/or voice compression can be supported.

According to a preferred embodiment, each voice trunk is setup dynamically as an individual switched virtual connection in the ATM switching network. Moreover, the T-IWF and the end office switch are positioned at the same location.

According to a preferred embodiment, the narrowband signaling is SS7 signaling. In addition, the broadband signaling is preferably PNNI, B-ISUP, and/or UNI.

A method is provided for transporting voice from an originating location to a destination across an Asynchronous Transfer Mode (ATM) network. The method includes transmitting the voice from the originating location to an originating trunk that leaves an end office switch; converting the originating trunk to ATM cells; and interfacing between narrowband and broadband signaling for call processing and control within the ATM network. Moreover, the method includes transmitting the voice within the ATM cells across the ATM network utilizing the broadband signaling; converting the ATM cells to a destination trunk; and transmitting the voice from the destination trunk to the destination.

According to a preferred embodiment, the transporting is enabled by emulating a circuit by employing a circuit emulation service. Further, the voice may be converted to ATM cells utilizing ATM adaptation layer 1 (AAL1). Alternatively, the voice may be converted to ATM cells utilizing ATM adaptation layer 2 (AAL2). If AAL2 is selected, silence suppression and/or voice compression is employed.

According to a preferred embodiment, each voice trunk is setup dynamically as an individual switched virtual connection in the ATM network. Moreover, converting the originating trunk to ATM cells occurs in the T-IWF within an originating end office and converting the ATM cells to a destination trunk occurs in the T-IWF within a destination end office.

According to a preferred embodiment, the narrowband signaling is SS7 signaling. In addition, the broadband signaling preferably is PNNI, B-ISUP, and/or UNI.

According to a preferred embodiment, an Asynchronous Transfer Mode (ATM)-based distributed virtual tandem switching system is provided in which a network of ATM-based devices is combined to create a distributed virtual tandem switch. The system includes an ATM switching network setup dynamically with individual switched circuits. The system also includes a trunk interworking function device and a centralized control and signaling interworking device. The trunk interworking function converts end office trunks from TDM channels to ATM cells by employing a circuit emulation service. The centralized control and signaling interworking function device performs call control functions and interfaces narrowband signaling and broadband signaling for call processing and control within the ATM switching network. Consequently, the ATM based distributed virtual tandem switching system replaces a standard tandem switch.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout several views of the drawings, and in which.

DETAILED DESCRIPTION OF THE PREFERRED EMBODIMENTS

An ATM-based distributed virtual tandem switching system is provided for replacing standard tandem switches and facilitating the reduction of necessary trunk groups without decreasing call processing volume.

Figure 1:
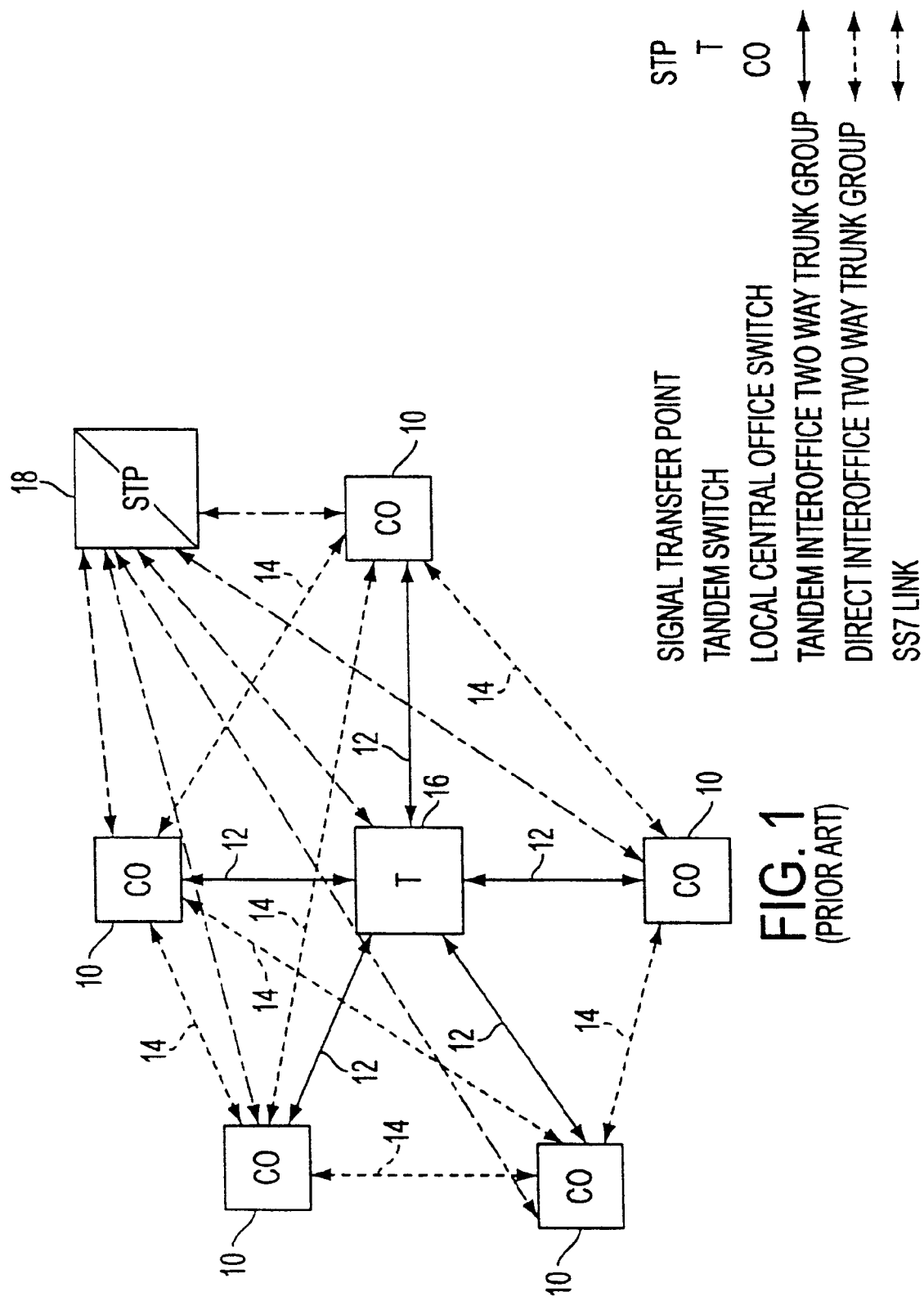
FIG. 1 shows a prior art system for communicating between end offices.
Figure 2:
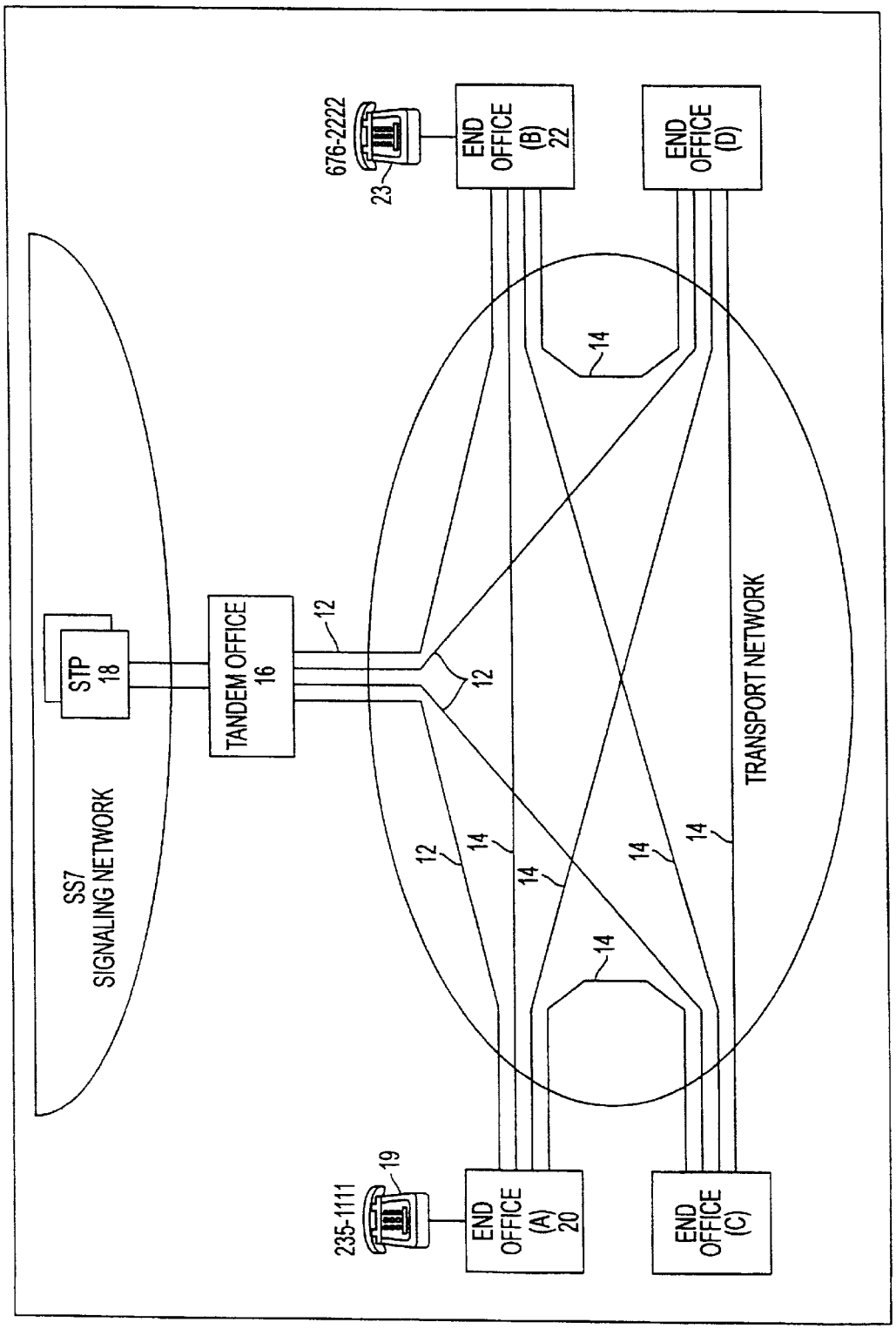
FIG. 2 shows a known trunk group architecture.
Figure 3:
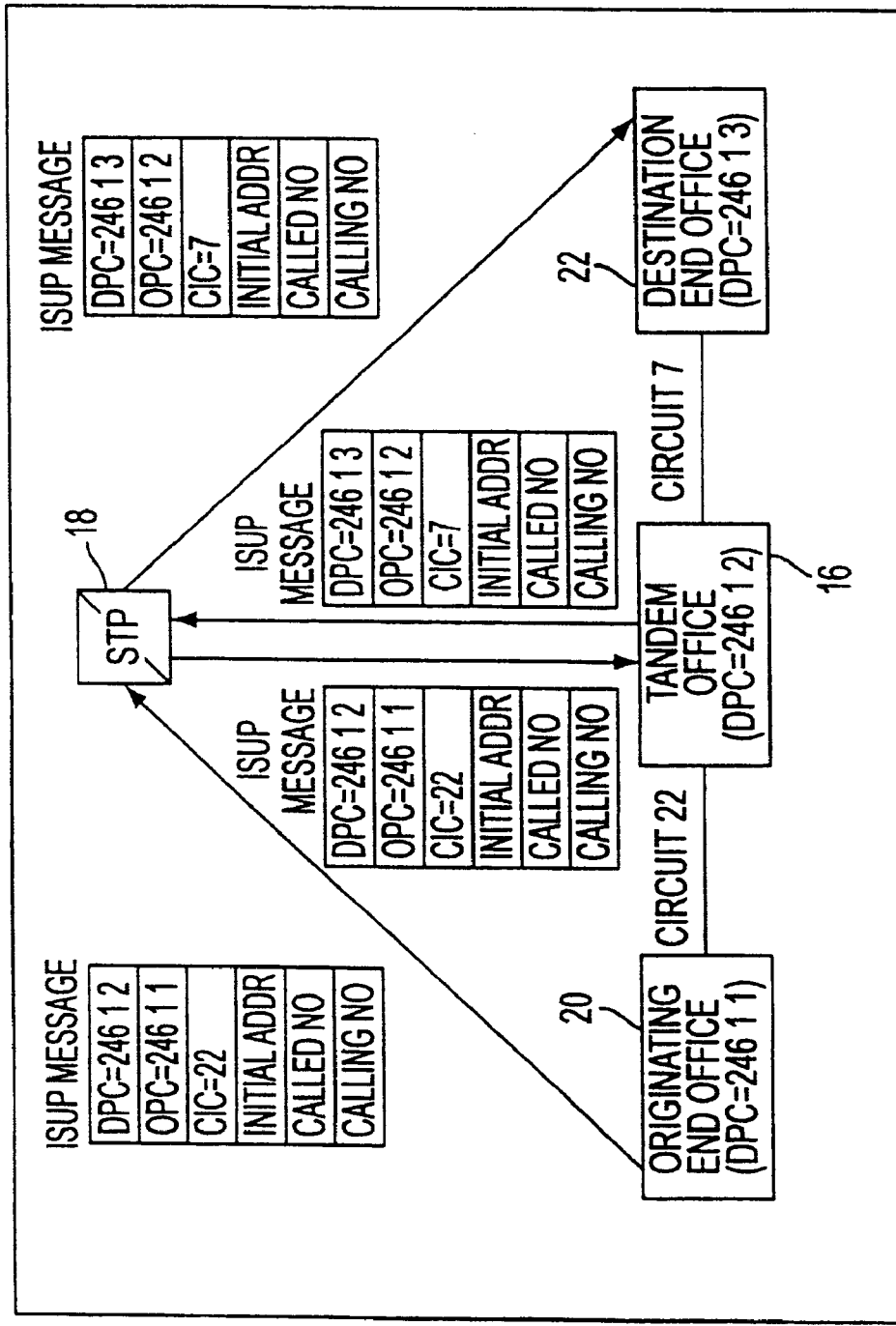
FIG. 3 shows a known dedicated out-of-band signaling network associated with a tandem network and exemplary ISUP messages.
Figure 4:
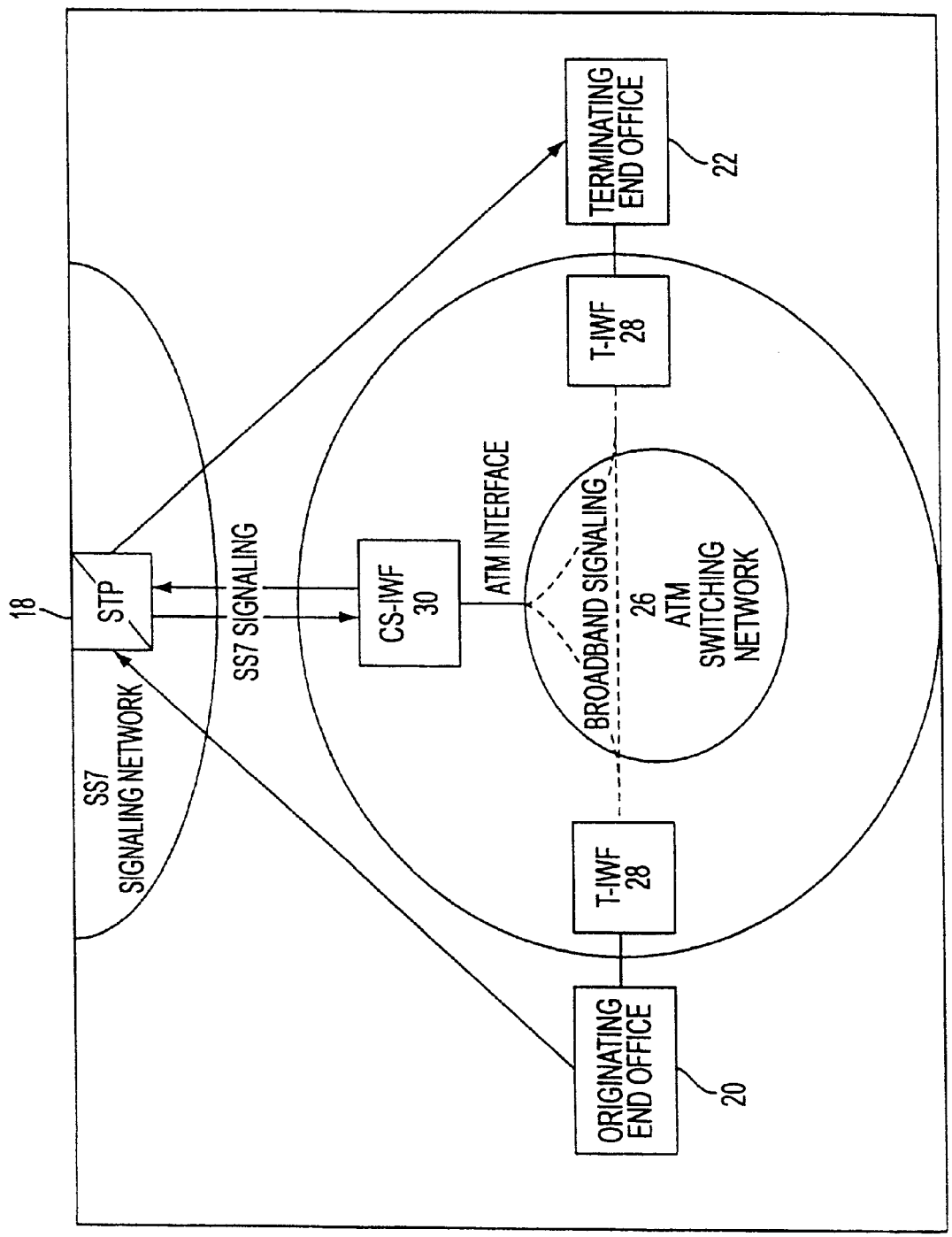
FIG. 4 shows an exemplary architecture of an ATM-based distributed virtual tandem switching system according to an aspect of the present invention.

Referring now to FIG. 4, the ATM-based distributed virtual tandem switching system according to the present invention is described. Originating end office 20 and terminating end office 22 are similar to the central offices 10 shown in FIG. 1. The end offices 10 are typically Class 5 switches such as the 5ESS available from Lucent Technologies, Inc. of Murray Hill, N.J., or the DMS1OO available from Northern Telecom Ltd. (Nortel Networks) of Canada. However, any other Class 5 end office switch may be substituted for the Nortel and Lucent switches. Also shown is a signaling transfer point (STP) 18. The signaling transfer point 18 is well known in the art and may be provided, for example, by Alcatel of France. The signaling transfer point 18 communicates with the end offices 20, 22 via SS7 signaling as described above. An asynchronous transfer mode (ATM) switching network 26 is also provided. The ATM switches within the network can be provided by vendors such as, but not limited to, Lucent, Cisco Systems, Inc. of San Jose, Calif., or Nortel.

A trunk interworking function (T-IWF) device 28 is also provided. Although described as a device, the T-IWF 28 can be multiple devices or any combination of hardware and software. The T-IWF 28 converts end office 20, 22 voice trunks from TDM channels to ATM cells. More particularly, the T-IWF 28 segments the 64 Kbps bearer channels into ATM cells in one direction and reassembles ATM cells in the 64 Kbps channels in the other direction. Preferably, the T-IWFs 28 are distributed throughout the PSTN with a T-IWF 28 corresponding to each end office 20, 22. An exemplary T-IWF 28 is a Succession Multiservice Gateway (SMG) 4000, provided by Nortel. However, any other T-IWF 28 may be employed.

The ATM-based distributed network also requires a centralized control and signaling interworking function (CS-IWF) device 30. Although described as a device, the CS-IWF 30 can be multiple devices or any combination of hardware and software. The CS-IWF 30 performs necessary call control functions as well as conversion between a narrowband signaling, e.g., Signaling System 7 (SS7), protocol, and a broadband signaling protocol for call processing and control within the ATM network. Preferably, a single CS-IWF 30 serves all the T-IWFs 28 in a metropolitan area. An exemplary CS-IWF 30 is a Succession Call Server (SCS), provided by Nortel. However, any other CS-IWF 30 may be employed.

The T-IWFs 28, the CS-IWF 30, the ATM switching network 26, and the interconnecting links together comprise the ATM-based distributed virtual tandem switching system. The system is distributed because the tandem functions are carried out in part by the T-IWFs 28 that are located near the end offices 20, 22 in a distributed manner. The system is virtual because as far as the end offices 20, 22 are concerned, the ATM-based distributed virtual tandem switching system is functionally equivalent to the traditional time division multiplexed (TDM) tandem switching system 16. Thus, end offices 20, 22 require only slight configuration changes in order to utilize the present invention. The virtual aspect also refers to the fact that the individual trunks are no longer DSO time slots that need to be statistically provisioned. Rather, the trunks are realized through dynamically established ATM switched virtual connections.

Deployment of the ATM-based distributed virtual tandem switching system allows an end office 20, 22 to handle normal call volumes while having only one or a few large trunk groups connecting to the ATM switching network, thus eliminating the need to provision separate trunk groups to different destination end offices. In addition, the total trunking bandwidth is shared by traffic to all destinations because ATM virtual connections are provisioned on demand by signaling. Consequently, bandwidth is not dedicated to any TDM voice channels between predetermined locations, but rather is dynamically shared.

According to a preferred embodiment, end offices 20, 22 have a single large trunk group that connects with the virtual tandem switch, although exceptions may exist where more than one trunk group is needed, for example, if an end office limits the number of members in a trunk group connected to the end office. Consequently, the direct interoffice trunks 14 between end offices 10 (shown in FIG. 1) are eliminated.

Thus, the present invention reduces the total number of trunks needed in an end office 20, 22, improves trunk utilization, and reduces or eliminates the task of trunk forecasting and provisioning. Furthermore, growth in trunking needs by the end office switches 20, 22 can be more easily met because the virtual tandem switching system of the present invention allows scalability supported by ATM networks. The scalability is achieved because of the ATM network's greater bandwidth and the ATM network's statistical multiplexing, which more efficiently utilizes existing bandwidth. The trunk interworking function T-IWF 28 is a device that is preferably located in the same structure or building that houses each end office switch 20, 22. More particularly, the T-IWF 28 is implemented with one or more physical devices that are external to the switch 20, 22, but within the same end office that houses the corresponding switch(es) 20, 22. The reason for the co-location is that the sooner the TDM trunks are converted to ATM, the earlier the advantages of ATM statistical multiplexing gains are enjoyed. Because the T-IWF 28 is physically located in the central office 20, 22, the T-IWF 28 must meet the central office environmental requirements. In a preferred embodiment, network equipment building standards (NEBS) level 3 is satisfied.

Because ATM is a packet oriented rather than circuit oriented technology, ATM must emulate circuit characteristics in order to carry constant bit rate (CBR) traffic such as voice. This emulation is referred to as a circuit emulation service (CES). The T-IWF 28 converts between the 64 Kbps trunks and ATM cells by employing a well known method of circuit emulation that is described in "Circuit Emulation Service Interoperability Specification Version 2.0" by The ATM Forum Technical Committee (January 1997), which is expressly incorporated herein by reference in its entirety. Preferably, the structured digital service level 1 (DS1) n×64 Kbps service described in the CES interoperating specification is employed to connect DS1 equipment across emulated circuits carried on an ATM network. The structured DS1 n×64 Kbps circuit emulation system efficiently carries TDM trunks through the ATM trunking network. The structured DS 1 CES requires ATM switches to treat one or more DS0s in a T1 circuit as individual ATM virtual connections.

According to the structured DS 1 CES service, each interworking function is connected to an ATM network 26 via physical interfaces. The physical interfaces are ATM user network interface (UNI) physical interfaces that have two characteristics or requirements. The first requirement is that the ATM interface provides adequate bandwidth to carry n×64 traffic after segmentation. The second requirement is that the ATM interface must be able to convey timing traceable to a primary reference source from the ATM network to the interworking function when external connection to network timing is not supported. The interworking functions are also connected to standard constant bit rate (CBR) circuits, such as end offices 20, 22. Connected in this manner, the interworking functions extend the constant bit rate (CBR) circuit across the ATM network 26 in a manner transparent to the switches 20, 22.

An important function of the circuit emulation service operating within the T-IWF 28 is the adaptation of circuit traffic to ATM cells. This function is called the ATM adaptation. As described above, when time division multiplexed trunks are converted to ATM cells, the ATM adaptation process occurs. More generally, ATM adaptation refers to converting non-ATM formatted information into the size and format of ATM cells. For circuit traffic such as voice to be converted into ATM format, two adaptation layers that can be suitably used are ATM adaptation layer 1 (AAL1) and ATM adaptation layer 2 (AAL2). However, the present invention is not limited to AAL1 and AAL2 and other layers that can satisfactorily convert the traffic into ATM cells, such as AAL5, may be employed.

According to one preferred embodiment, the structured DS1 n×64 Kbps circuit emulation service employs AAL1 such that circuit traffic is treated as constant bit rate (CBR) traffic within the ATM tandem switching system. However, the system is not limited to AAL1 and other protocols such as AAL2 may be adopted to incorporate bandwidth saving features such as voice compression and silence suppression, which can further improve bandwidth efficiency.

AAL1 has been standardized in both International Telecommunications Union Telecommunication (ITU-T) and American National Standards Institute (ANSI) since 1993 and is preferred for use with circuit emulation services due to its simplicity. AAL1 is designed to support constant bit rate services and allows the specification of peak cell rate, cell loss ratio, and cell delay variation. Depending on implementation, the peak cell rate bandwidth may be dedicated or guaranteed.

There is a difference between dedicated and guaranteed bandwidth. When the peak cell rate bandwidth is said to be dedicated to the constant bit rate service, no other services can utilize any of the constant bit rate's bandwidth, even if it is not utilized by the constant bit rate service itself. However, if the peak cell rate bandwidth is guaranteed to the constant bit rate service, the unused portion of the constant bit rate's dedicated bandwidth can be utilized by other services, so long as the other services agree to return the bandwidth when the constant bit rate service needs it.

AAL1 introduces additional delay because each AAL1 ATM connection carries information for only a single user. With voice input at 64 Kbps, it takes 5.875 milliseconds, or approximately six milliseconds to fill an AAL 1 payload of an ATM cell.

One alternative to AAL1 is AAL2. AAL2 started as a contribution to committee T1S1.5, an ANSI standards subcommittee. AAL2 was later introduced to the ITU-T Study Group 13 on May, 1996 under the temporary name of AAL-CU where CU stood for composite user. AAL2 has now been defined-in the ITU-T Recommendation 1363.2.

AAL2 enables voice to be carried as variable bit rate (VBR) data while maintaining its delay sensitive nature. AAL2's support for variable bit rate (VBR) traffic allows many bandwidth saving features, such as voice compression and silence suppression to be employed. These features are discussed in more detail below.

AAL2 enables multiple users to share a single ATM connection, while allowing each user to select a potentially different quality of service parameter. The structure of AAL2 also allows for the packing of short length packets into one or more ATM cells. In contrast to AAL1, which has a fixed payload size, AAL2 offers a variable payload within cells and across cells. The variable payload provides a dramatic improvement in bandwidth efficiency of the structured circuit emulation over AAL1.

An important aspect of AAL2 is the packet fill delay parameter. The packet fill delay parameter allows the network operator to set a time period during which AAL2 protocol data units are assembled and then segmented into ATM cells. The setting of this parameter allows the network operator to control the cell construction delay. This allows the operator to trade off delay and bandwidth efficiency in order to meet the delay requirements of some voice connections. For example, for 64 Kbps pulse code modulation (PCM) voice to fill up an ATM cell, it takes six milliseconds. AAL2 can reduce this delay by half by setting the packet fill delay to 3 milliseconds, which would result in each ATM cell payload being half filled. Thus, 50% bandwidth loss is traded for 50% less delay.

Essentially what AAL1 or AAL2 allow is the choice of carrying voice trunks through an ATM network as constant bit rate traffic or variable bit rate traffic. If voice is sent as constant bit rate traffic, then ATM Forum's structured DSI n×64 Kbps circulation emulation service using AAL1 is employed. If voice is sent as real time variable bit rate traffic, then AAL2 as the ATM adaptation layer is employed, thus taking advantage of the many efficiency and performance enhancing features supported by AAL2.

The ATM network 26 will now be discussed. From a physical connection point of view, the ATM trunks between switching offices may be setup with direct point-to-point fibers or by means of a synchronous optical network (SONET) ring. However, logically ATM allows the interoffice trunks to be setup in many different ways. Thus, within the ATM switching network 26, originating and terminating trunks are preferably connected by means of virtual connections setup in one of three ways.

According to a preferred embodiment of the invention, individual switched virtual connections (SVC) are provided in which an ATM switched virtual connection is established for each n×64 Kbps call. When utilizing individual switched virtual connections, the switched virtual connections are dynamically provisioned via signaling and a peak cell rate is set equal to n×64 Kbps. Available ATM network bandwidth that would otherwise be dedicated to carrying voice traffic can be utilized by other data applications on a dynamic basis. Individual switched virtual connections have the advantage that they are automatically setup, and on demand provisioning results in trunk bandwidth efficiency.

According to another embodiment, a mesh permanent virtual path (PVP) is provided. The mesh permanent virtual path establishes an ATM permanent virtual path across the ATM tandem network between every two end offices. Thus, the permanent virtual paths are manually provisioned with a peak cell rate equal to the size of the existing trunk group between the two end offices. As with individual switched virtual connections, available ATM network bandwidth that would otherwise be dedicated to carrying voice traffic can be utilized by other data applications on a dynamic basis. Among, the advantages of the mesh permanent virtual path are that little or no signaling is required depending upon how many virtual connections are used within the permanent virtual paths. That is, all that is required is getting allocated within a path; no setup is required. In addition, every end office perceives direct trunks with every other end office. However, the mesh permanent virtual path requires manual provisioning and the preallocated and guaranteed constant bit rate bandwidth reduces trunk bandwidth efficiency.

According to yet another embodiment, a star permanent virtual path is provided. With a star permanent virtual path, a single ATM permanent virtual path is established between each end office and the ATM tandem network. The permanent virtual path is manually provisioned such that only one permanent virtual path is provisioned and a peak cell rate is set equal to the sum of all the trunks of the end office. As with the other two systems, available ATM network bandwidth that would otherwise be dedicated to carrying voice traffic can be utilized by other data applications on a dynamic basis. Similar to the mesh permanent virtual path, the star permanent virtual path has the advantage of little or no signaling, depending on if and how virtual connections are used in the permanent virtual path. Moreover, each end office perceives a single tandem trunk. In addition, switch translation is easy because it appears that a single trunk leaves each end office. Thus, all traffic is directed to that trunk group. However, the star permanent virtual path has the drawbacks of manual provisioning, and preallocated and guaranteed constant bit rate bandwidth reduces trunk bandwidth efficiency.

The star permanent virtual path and the mesh permanent virtual path remove the majority of the call setup load from the switch by utilizing manually provisioned permanent virtual paths. Utilizing the individual switched virtual connection increases call setup load due to the elimination of direct trunks. That is, calls previously using direct trunks will now traverse to the ATM tandem switch.

The function of the CS-IWF 30 is to bridge between narrowband signaling in the PSTN and broadband signaling within the ATM network 26. Two types of interoffice signaling methods are employed in present day networks, common channel signaling (CCS) (i.e., narrowband signaling) and channel associated signaling (CAS). CAS is an older kind of signaling in which signaling information is carried in the same bearer channel as the user information and is of little concern to the present invention. Because the dominant interoffice signaling protocol currently in use is Signaling System 7 (SS7), the CS-IWF 30 is provided for interacting with SS7 and enabling support of SS7 within the ATM network 26. SS7 is a common channel signal (CCS) protocol for call control information. The protocol is transported via a physically separate network from that of the voice bearer channels.

Figure 5:
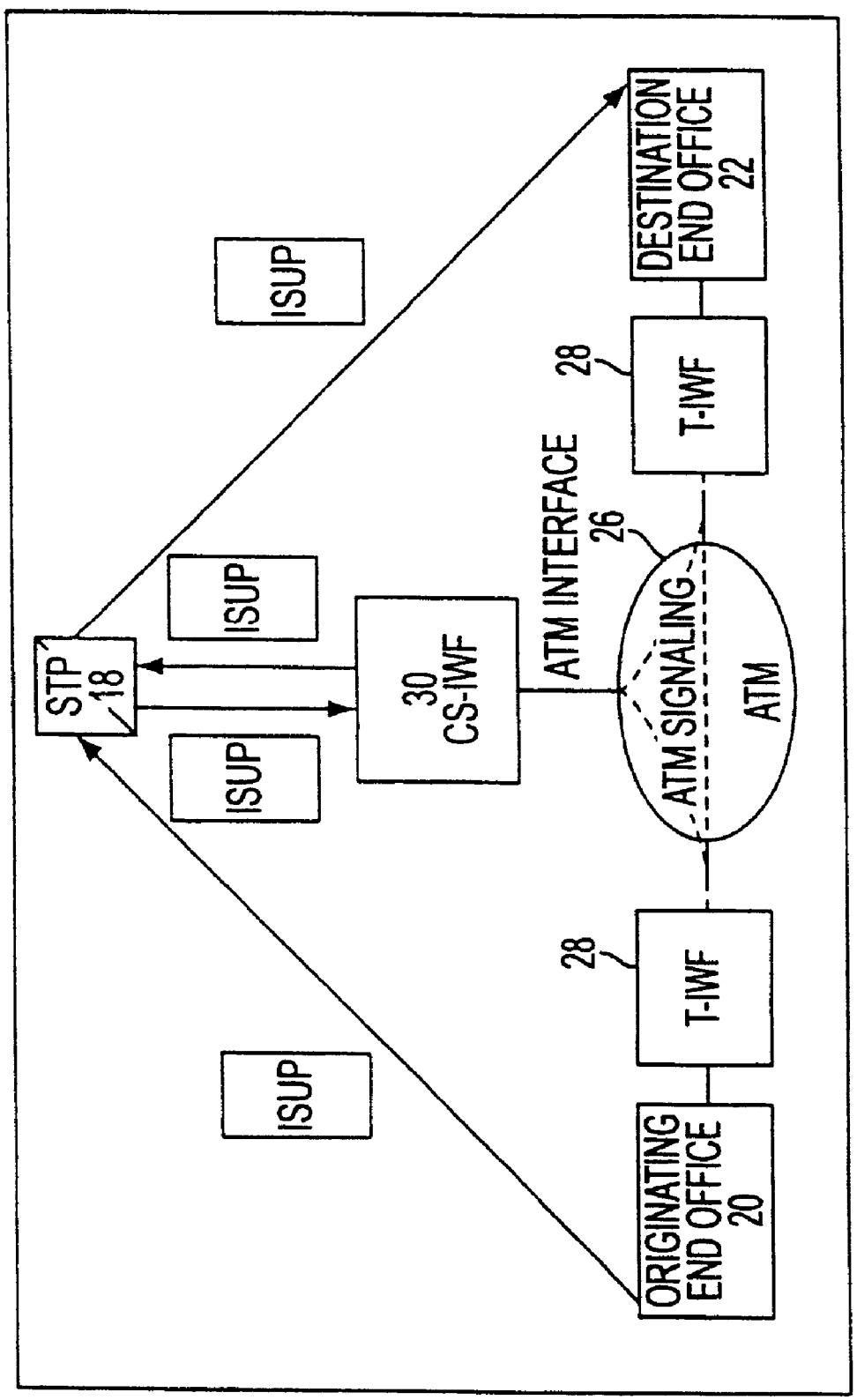
FIG. 5 shows an exemplary architecture of an ATM-based distributed virtual tandem switching system including an out-of-band signaling network, according to an aspect of the present invention.

With reference to FIG. 5, explanation is provided as to how the present invention supports the SS7 signaling within the ATM network 26 by preserving the existing SS7 signaling process and the ISUP message integrity. The originating end office 20 sends its ISUP message to the signaling transfer point 18 as described above. Subsequently, the signaling transfer point 18 forwards the message to the CS-IWF 30, which translates incoming ISUP messages into ATM signaling messages. For example, the unique point codes are translated into ATM addresses. An ATM connection is then established between the two T-IWFs 28 via an ATM signaling protocol such as broadband-ISDN user part (B-ISUP) defined by the ITU-T, PNNI defined by the ATM Forum, or UNI 3.0, 3.1, 4.0 defined by the ATM Forum. On the destination side, the T-IWF 28 composes an ISUP message and sends it to the signaling transfer point 18, which then completes the connection setup with ISUP messages to the destination end office 22.

An exemplary call flow according to the present invention is now described with reference to FIG. 5. After the originating end office creates an ISUP message, the originating end office sends the ISUP message to the signaling transfer point 18. The signaling transfer point 18 routes the ISUP message to the CS-IWF 30 via a set of A-links (connections between the end office and the STP). At the CS-IWF 30, the ISUP message is processed and call control information is distributed to the T-IWFs 28 via the ATM network 26. The CS-IWF 30 also formulates an ISUP message regarding the receiving trunk and sends it back to the signaling transfer point 18. The signaling transfer point 18 routes the ISUP message to the terminating end office 22. The terminating end office then reserves the corresponding trunk. At this point, an ATM virtual connection can be established between the T-IWFs 28 to carry the voice traffic. Thus, the CS-IWF 30 converts between narrowband and ATM signaling to establish connections. The ATM virtual connections are dynamically setup by the system via signaling as described above with reference to the SVCs. Although the signaling protocols must be standards based, such as ATM UNI or PNNI, the exact protocol may vary among implementations.

Transporting the ISUP messages from the end offices 20, 22 can be accomplished in two ways. The ISUP messages can be carried in the SS7 network without change, or the ISUP messages can be carried in the ATM network in a special ATM connection. According to a preferred embodiment, the ISUP messages are carried in the SS7 network because it simplifies the IWF's responsibility and preserves the out of band nature of the SS7 signaling network.

The CS-IWF 30 should have a unique point code. For a system with a redundant pair of CS-IWFs, two point codes may be assigned. Two sets of T1 interfaces to a mated pair of signaling transfer points should also be provided. In addition, an ATM OC-3 user to network interface (UNI) to the ATM network should be provided. Preferably, the CS-IWF 30 currently supports a trunking -network of at least 500,000 trunks and is able to connect 3,000,000 calls in a busy hour. As new processors are developed, capacity will increase.

Preferably, the T-IWF 28 scales from less than 100 to 16,000 trunks. Similar to the CS-IWF 30, as new processors are developed, capacity will increase. According to a preferred embodiment, the interface is T1, T3, and OC-3 compatible on the TDM end and DS-3, OC-3, and OC-12 on the ATM side. Preferably the ATM signals are UNI 3.1, UNI 4.0, or PNNI 1.0 on the ATM side. Each call is carried by an ATM switch virtual connection setup via signaling. The T-IWF 28 is a multiplexer as opposed to a switch. That is, the switching function is not within the T-IWF 28 for cost considerations.

From an implementation point of view, the T-IWF 28 and the CS-IWF 30 can be separate (as described above in the preferred embodiment), or integrated. If they are implemented as separate entities, one CS-IWF 30 may serve one T-IWF 28, or the CS-IWF 30 may centrally serve multiple T-IWFs 28.

Multiple implementations are possible for the T-IWF 28. It may be integrated into the switch 20, 22, may be integrated into an ATM edge switch, or may be provided as a stand-alone special purpose device having no switching capability. Providing the T-IWF 28 within the ATM edge switch or as a stand-alone requires minimum or no change to existing switches 20, 22. Preferably, the T-IWF 28 is closely co-located with the switch 20, 22 in the same end office in order to maximize trunking efficiency.

Figure 7:
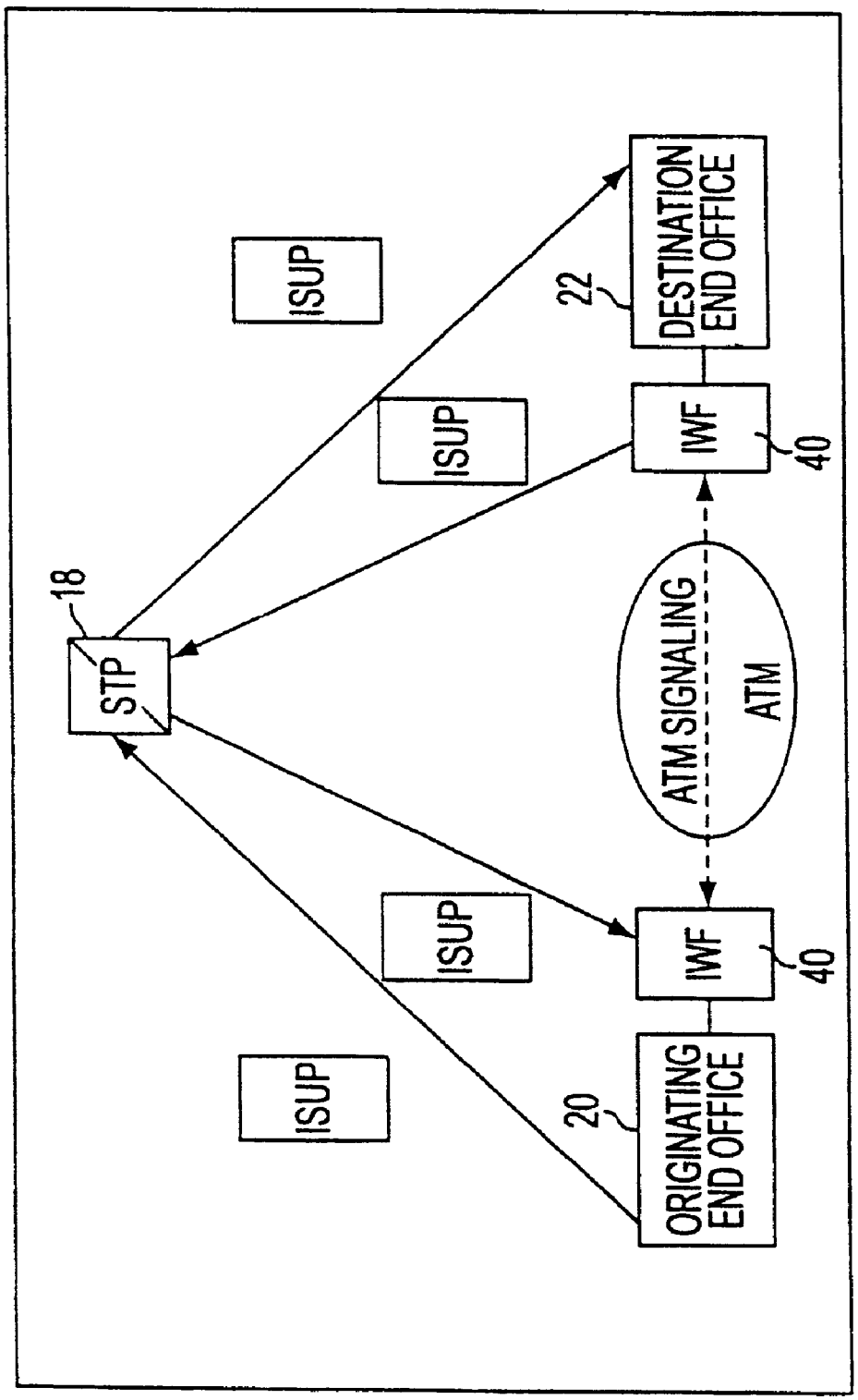
FIG. 7 shows an alternative architecture for an ATM-based distributed virtual tandem switching system.

The CS-IWF-30 may be integrated into the switch 20, 22 or an ATM edge switch, or may be a stand-alone, special purpose device having no switching capability. The CS-IWF 30 can also be integrated into the signal transfer point 18. As shown in FIG. 7, if the CS-IWF 30 is part of the ATM edge switch, the ATM edge switch preferably operates as an integrated IWF 40, i.e., containing both the T-IWF 28 and the CS-IWF 30. In this case because the CS-IWF 30 and the T-IWF 28 are physically integrated into the ATM edge switch, they maintain a one-to-one relationship. Preferably, the ATM edge switch is then co-located with the switch in the end office. According to this embodiment, the CS-IWFs 30 are seen as distributed to each end office.

According to an embodiment of the present invention, silence suppression is employed. Silence suppression is a mechanism for saving extra network bandwidth by not transmitting the pauses in a voice conversation into the network. Silence suppression can be employed on the sender's end by not generating voice samples when the speech level is below a threshold. With adaptive differential pulse code modulation (ADPCM) the silence suppression results in fewer bits per sample during speech inactivity. Silence suppression can be performed in an ATM trunking network, for example, by a voice module on an ATM edge switch. The voice module detects silence and stops the transmission of these silent intervals into the ATM network.

Silence suppression also suffers from side effects. For example, because silence suppression removes background noise, a listener may think that the line has been disconnected when a pause in the conversation occurs. Silence suppression also increases the ATM cell construction delay and adds variability to the delay. Silence suppression should always be disabled when fax or modem tones are detected. For ATM trunking, the silence suppression feature is not required, however, the availability of silence suppression does improve the network efficiency.

Voice compression is another way of saving network bandwidth. Voice compression employs algorithms such as ADPCM to reduce standard PCM 64 Kbps voice tone to 32 Kbps, 24 Kbps, 16 Kbps, or even 8 Kbps. However, the side effects of voice compression are degraded voice quality and increased ATM cell construction delay. As with silence suppression, voice compression is not required but may be employed in an embodiment of the present invention.

ATM trunking for narrowband services introduces delay additional to the delay caused by transport over the ATM network. The additional delay is primarily associated with buffering to accommodate cell delay variation introduced by the ATM network and cell construction delay. Thus, the three types of delay that voice traffic may experience when carried by an ATM network are: ATM switch and network transit delay, buffering delay in the ATM switch to accommodate cell delay variation, and ATM cell construction delay. While the first two types of delay are dependent on switch design, physical medium, distance, and traffic condition, etc., the ATM cell construction delay, when employing the AAL 1 circuit emulation service, is fixed. As mentioned above, for 64 Kbps pulse code modulated (PCM) voice, it takes six milliseconds to fill an ATM cell with a single voice channel. The total echo path time is thus 12 milliseconds plus additional transit and buffering delays. For compressed voice, for example 32 Kbps using ADPCM, the delay will be doubled to 24 milliseconds because it now takes twice as long to fill an ATM cell with the speech data of a single voice channel.

In order to counteract excessive delay, appropriate echo control measures are employed on all speech connections where end delay is significant. According to a preferred embodiment, an active echo control device is employed on all connections that exceed the total one way talk or echo transmission path of 25 milliseconds.

Figure 6:
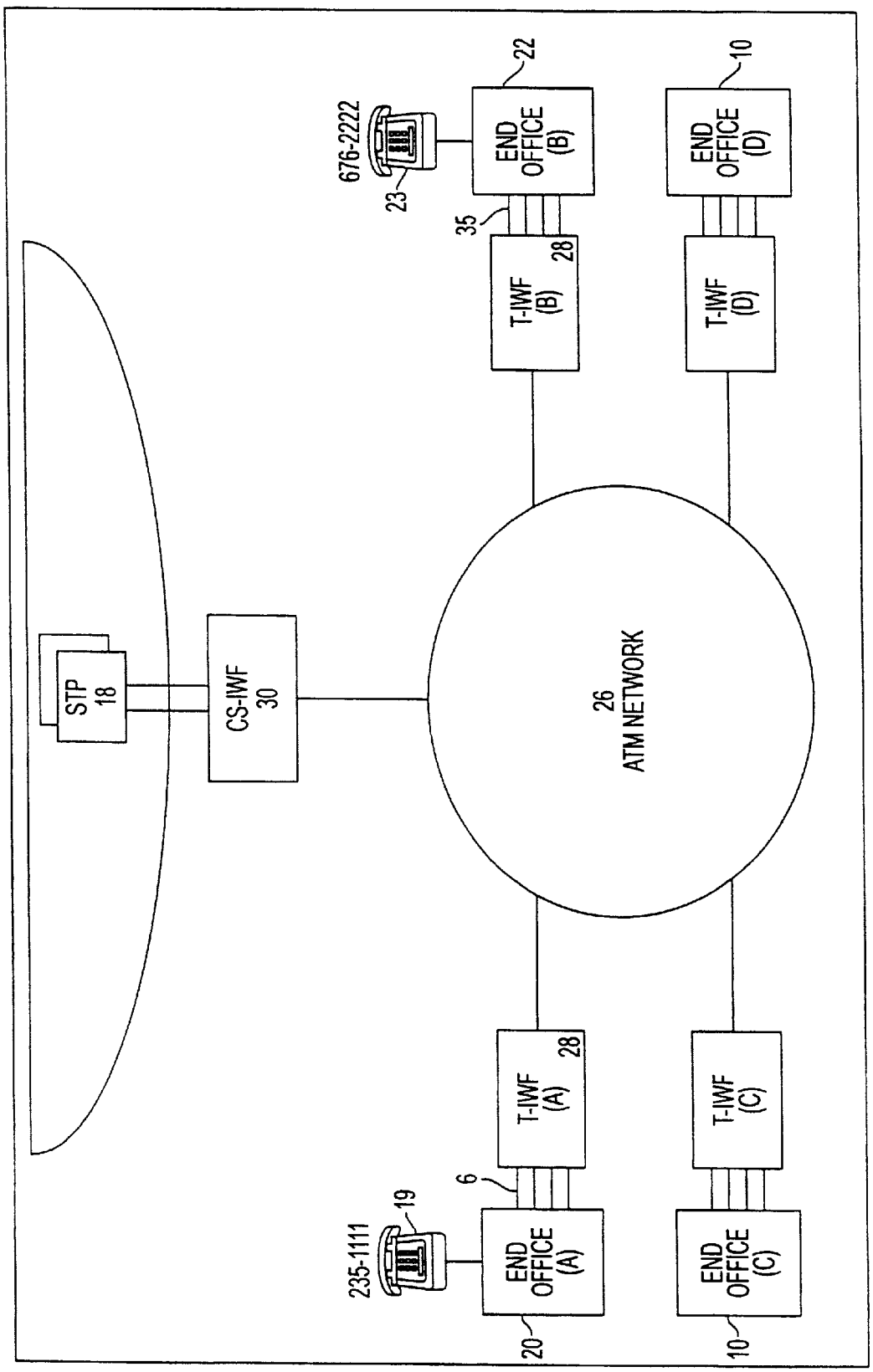
FIG. 6 shows an exemplary trunk group architecture according to an aspect of the present invention.

A call flow scenario according to the present invention is now described with reference to FIG. 6. Initially, a calling party 19, e.g., 235-1111 dials a destination 23, e.g., 676-2222. The calling party's end office 20 (end office A) collects the dialed digits corresponding to the called number and checks routing tables to determine the end office that is connected to the dialed destination. After determining the destination end office 22 (end office B), end office A finds a trunk (e.g., trunk 6) connecting to end office A=s T-IWF 28. Assuming that the trunk is idle, end office A reserves trunk 6.

End office A then initiates an SS7 IAM message containing, among other information, the following: signaling transfer point routing address of the CS-IWF 30; calling telephone number; called telephone number; and trunk identification (CIC) for trunk 6. After the signaling transfer point 18 receives the IAM message, the signaling transfer point 18 forwards the message to the CS-IWF 30. The CS-IWF 30, based on the calling-telephone number, identifies the originating T-IWF 28 (T-IWF A) with its ATM address or other identifier. The CS-IWF 30 then sends the CIC to T-IWF A via an ATM message through the ATM network (i.e., in-band signaling). The CS-IWF 30, based on the called telephone number, identifies the destination T-IWF 28 (T-IWF B) with its ATM address or other identifier. The CS-IWF 30 then sends a request to T-IWF B for an idle trunk, via an ATM connection (i.e., inband signaling) in the ATM network 26.

T-IWF A receives the message from the CS-IWF 30 and based on the received CIC, determines the corresponding DSO channel on its line interfaces. T-IWF B also receives a request from the CS-IWF 30. Accordingly, T-IWF B finds an idle DSO channel on its line interfaces and reserves it, e.g., trunk 35. T-IWF B determines the CIC for this DSO and sends the CIC to the CS-IWF 30 via an ATM message.

The CS-IWF 30 receives the message from T-IWF B and sends an IAM message to the signaling transfer point 18 containing, among other information, the following: signaling transfer point routing address of end office B; calling telephone number; called telephone number; and trunk identification (CIC). The signaling transfer point 18 receives the IAM message and forwards it to end office B.

End office B receives the AM message and uses the received CIC to reserve the corresponding trunk, trunk 35. End office B checks the called telephone number for on-hook and active call features. End office B holds the line, applies ringing to the line and a ring tone to trunk 35 (assuming that 676-2222 is on-hook). End office B then connects the line to trunk 35 and initiates an SS7 ACM message to the signaling transfer point 18.

The signaling transfer point 18 receives the ACM message and forwards it to the CS-IWF 30. When the CS-IWF 30 receives the ACM message, the CS-IWF 30 sends the message to T-IWF A, requesting that T-IWF A establishes an ATM connection with T-IWF B or vice versa. That is, T-IWF B can establish a connection with T-IWF A.

In response to the received message, T-IWF A establishes a 64 Kbps CBR connection with T-IWF B. T-IWF A also maps the appropriate DSO to the outgoing switched virtual connection. At the same time, T-IWF B associates the incoming switched virtual connection to the corresponding DSO. After the connection is established, T-IWF A sends an ATM message to the CS-IWF 30, indicating the establishment of the ATM connection.

The CS-IWF 30 receives the message from T-IWF A and the CS-IWF 30 sends an ACM message to the signaling transfer point 18. The signaling transfer point 18 receives the ACM message and forwards it to end office A. End office A receives the ACM message from the signaling transfer point 18 and connects 235-1111 to trunk 6.

Consequently, the calling party 19 at 235-1111 hears the ringing tone. When the destination 23 at 676-2222 picks up the phone, end office B detects the off-hook and removes the ringing tone. End office B then initiates an ANM message to the signaling transfer point 18. The signaling transfer point 18 receives the ANM message and forwards it to the CS-IWF 30. The CS-IWF 30 receives the ANM message from the signaling transfer point 18 and initiates an ANM message to the signaling transfer point 18.

The signaling transfer point 18 receives the ANM message from the CS-IWF 30, and forwards it to end office A. End office A receives the ANM message from the signaling transfer point 18 and starts necessary billing measurement. Finally, the calling party 19 at 235-1111 talks to the destination 23 at 676-2222.

The present invention thus allows for savings in three broad categories: end office trunk termination reduction and/or growth offsets, bandwidth reduction on transport facilities associated with end office trunk termination reduction, and administrative savings associated with trunk forecasting and trunk record keeping.

The use of large trunk groups according to the present invention creates an increased carrying capacity that results in a reduction in end office trunk unit requirements. The reduction allows for a decrease in capital outlays for trunk units and/or allows for more rapid response to the increasing trunk requirements brought about by new traffic such as Internet access traffic.

Bandwidth reduction on transport facilities also occurs because current interoffice trunks utilize bandwidth whether the trunk is in use or not. The present invention permits trunks to utilize bandwidth on transport facilities only when the trunk is in use. When the trunk is idle, no bandwidth on the transport facility is required. During low traffic periods such as late evenings and early mornings, available bandwidth on the transport facilities could increase in excess of 50%. Consequently, the bandwidth is available for other applications, such as data or file transfers.

Administrative savings are realized in two areas, trunk forecasting and trunk record keeping. The nature of trunking today requires huge investments in hardware and software for systems to keep track of individual interoffice trunks. The present invention negates the need for such detailed record keeping by individual trunk because the trunks are virtual. Therefore, individual trunks spanning the network exist only when the calls are in progress. Consequently, keeping records on individual interoffice trunks can be drastically reduced.

Trunk forecasting and provisioning for thousands of individual trunk groups can be reduced to just a few trunk groups per end office. Call loads for the end office can be used to forecast trunk requirements rather than individual trunk and trunk group measurements. Data collection can also be simplified due to a reduction in the amount of data needed to accurately measure office carrying capacity loads.

According to another embodiment, the Class 5 feature set may reside within the CS-IWF 30. Further, a switch management system may be provided to manage all switch peripherals and do all OAM&P (operations, administration, maintenance, and provisioning) for the switch. The switch management system will do point-to-point private line set-ups.

The present invention has utility in many environments other than tandem switching systems, such as a wireless environment and a digital subscriber line environment. For wireless services, a T-IWF can be placed in the mobile switching center to convert the trunk traffic to ATM traffic and send it to the ATMf-based virtual tandem switch. The T-IWF may operate with asymmetric digital subscriber lines (ADSL) by hosting the digital subscriber line access multiplexer (DSLAM) function.

The present invention also applies to Internet services providers. The present invention facilitates a more efficient way of carrying dial up Internet connections. Currently, an Internet user typically accesses the Internet by connecting to the Internet service provider via a dial up modem. That style of connection consumes resources in the PSTN network just like a regular voice connection. However, unlike a voice connection, a modem connection carries bursty data with Internet Protocol (IP) packets. It is wasteful for bursty data to be carried by TDM circuits. Thus, the T-IWF provides an ideal place to implement a modem pool that terminates the dial up connections and converts them to ATM connections. These ATM connections can be carried by the ATM network to the respective Internet service providers. Depending on the Internet service provider's ability to receive ATM connections, these connections may be delivered to the Internet service provider as ATM, or be converted back to IP packets. The modem termination capability on the T-IWF helps make more efficient use of network resources by carrying Internet traffic as data traffic using ATM connections.

The present invention also applies to broad band advanced intelligent networks (AIN). The CS-IWF is an ideal place for broad band advanced intelligent network capabilities to reside. Keeping the CS-IWF as a central point of intelligence with an open interface allows new services and capabilities to be developed and deployed in the entire network very quickly.

The present invention also has applicability in provisioning leased private lines (i.e., High Cap circuits). Provisioning leased private lines in today's network is a complicated and error prone process. Using the proposed ATM network, much of the complexity and provisioning can be eliminated, owing to ATM's capability of automatically setting up connections via signaling. Only the tail circuits at the end points need to be manually provisioned and maintained.

Interexchange carrier networks may also take advantage of the present invention. For end offices having trunks to an interexchange carrier (IXC) network, the IXC trunks remain time division multiplexed and unchanged. End offices not having direct trunks to the interexchange carrier network can choose to utilize either the time division multiplexed tandem network or the ATM band system to carry their traffic to the interexchange carriers. If the interexchange carrier trunks are carried by the ATM tandem network, a T-IWF will need to be placed at the interface between the local exchange carrier and the interexchange carrier networks to act as a gateway. For the ATM-based system, a similar T-IWF is provided at the interface between the local exchange carrier and the interexchange carrier network to act as a gateway. Further, the T-IWF may be provided with the ability to terminate trunks from an interexchange carrier. The T-IWF also ensures that billing is done correctly. This arrangement applies not only to interexchange carrier switches, but also to switches owned and operated by independent local telephone service providers or competitive local exchange carriers.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed:

1. An Asynchronous Transfer Mode (ATM) based distributed virtual tandem switching system, comprising:
    an ATM switching network comprising a plurality of ATM switches;
    a trunk interworking function (T-IWF) device adapted to receive end office voice trunks from TDM channels and convert the trunks to ATM cells; and
    a centralized control and signaling interworking function (CS-IWF) device that performs call control functions for the plurality of ATM switches and is adapted to interface narrowband and broadband signaling for call processing and control within the ATM switching network.

2. The ATM based distributed virtual tandem switching system of claim 1, wherein the ATM based distributed virtual tandem switching system is adapted to comprise a virtual switch in a PSTN.

3. The ATM based distributed virtual tandem switching system of claim 1, in which the T-IWF device comprises a circuit emulation service.

4. The ATM based distributed virtual tandem switching system of claim 3, in which the T-IWF device comprises ATM adaptation layer 1.

5. The ATM based distributed virtual tandem switching system of claim 3, in which the T-IWF device comprises ATM adaptation layer 2.

6. The ATM based distributed virtual tandem switching system of claim 5, in which at least one of silence suppression and voice compression is employed.

7. The ATM based distributed virtual tandem switching system of claim 1, in which the T-IWF device and an end office switch are positioned near each other.

8. The ATM distributed virtual tandem switching system of claim 1, in which the CS-IWF device comprises a plurality of CS-IWF devices, and in which each T-IWF device is assigned to an individual CS-IWF device.

9. The ATM based distributed virtual tandem switching system of claim 1, in which the narrowband signaling is SS7 signaling.

10. The ATM based distributed virtual tandem switching system of claim 9, in which the broadband signaling is PNNI.

11. The ATM based distributed virtual tandem switching system of claim 9, in which the broadband signaling is B-ISUP.

12. The ATM based distributed virtual tandem switching system of claim 9, in which the broadband signaling is UNI.

13. The ATM distributed virtual tandem switching system of claim 1, wherein an individual switched virtual connection is provided in the ATM switching network to dynamically setup each voice trunk.

14. A method for transporting voice from an originating location to a destination across an Asynchronous Transfer Mode (ATM) network via an originating trunk interworking function (T-IWF) device and a terminating T-IWF device, the method comprising:
    transmitting the voice from the originating location to an originating trunk that leaves an end office switch;
    converting the originating trunk to ATM cells;

interfacing between narrowband and broadband signaling at a centralized control and signaling interworking function (CS-IWF) device for call processing and control within the ATM network;

transmitting the voice within the ATM cells across the ATM network utilizing the broadband signaling;

converting the ATM cells to a destination trunk; and transmitting the voice from the destination trunk to the destination.

15. The method for transporting voice according to claim 14, in which the transporting is enabled by emulating a circuit by employing a circuit emulation service.

16. The method for transporting voice according to claim 15, in which the voice is converted to ATM cells utilizing ATM adaptation layer 1.

17. The method for transporting voice according to claim 15, in which the voice is converted to ATM cells utilizing ATM adaptation layer 2.

18. The method for transporting voice according to claim 17, in which at least one of silence suppression and voice compression is employed.

19. The method for transporting voice according to claim 14, in which each voice trunk is setup dynamically as an individual switched virtual connection in the ATM network.

20. The method for transporting voice according to claim 14, in which converting the originating trunk to ATM cells occurs in the originating T-IWF device within an originating end office and converting the ATM cells to a destination trunk occurs in the terminating T-IWF device within a destination end office.

21. The method for transporting voice according to claim 14, in which the narrowband signaling is SS7 signaling.

22. The method for transporting voice according to claim 21, in which the broadband signaling is PNNI.

23. The method for transporting voice according to claim 21, in which the broadband signaling is B-ISUP.

24. The method for transporting voice according to claim 21, in which the broadband signaling is UNI.

25. An Asynchronous Transfer Mode (ATM) based distributed virtual tandem switching system in which a network of ATM-based devices is combined to create a distributed virtual tandem switch, the system comprising:

an ATM switching network that dynamically sets up individual switched virtual connections, the ATM switching network comprising a plurality of switches;

a trunk interworking function (T-IWF) device that converts end office voice trunks from TDM channels to ATM cells by employing a circuit emulation service; and a centralized control and signaling interworking function (CS-IWF) device that performs call control functions for the plurality of ATM switches and interfaces narrowband signaling and broadband signaling for call processing and control within the ATM switching network;

wherein the ATM based distributed virtual tandem switching system is adapted to comprise a virtual switch in a PSTN.

26. An Asynchronous Transfer Mode (ATM) distributed virtual tandem switch comprising:

a centralized control and signaling inter-working function (CS-IWF) device that performs call control functions for a plurality of ATM switches and converts between narrowband and broadband signaling for call processing and control within an ATM switching network comprising the plurality of ATM switches;

a first trunk inter-working function (T-IWF) device that converts trunks from end office switches to ATM cells; and a second trunk inter-working function (T-IWF) device that converts ATM cells to trunks for end office switches;

wherein telephone calls originating and terminating within an advanced intelligent network are transmitted through the ATM switching network.

27. The ATM distributed virtual tandem switch of claim 26, wherein each T-IWF device employs a structured circuit emulation service to emulate a circuit.

28. The ATM distributed virtual tandem switch of claim 26, wherein individual switched virtual connections are provided that dynamically set up the ATM switching network.

29. The ATM distributed virtual tandem switch of claim 26, in which the CS-IWF device comprises a plurality of CS-IWF devices, wherein each T-IWF device is assigned to an individual CS-IWF device.

30. An Asynchronous Transfer Mode (ATM) distributed virtual tandem switch comprising:

a centralized control and signaling inter-working function (CS-IWF) device that performs call control functions for a plurality of ATM switches and converts between narrowband and broadband signaling for call processing and control within an ATM switching network;

wherein telephone calls originating and terminating within an advanced intelligent network are transmitted through the ATM switching network and are controlled, within the ATM switching network, by the CS-IWF device.

31. The ATM distributed virtual tandem switch of claim 30, wherein individual switched virtual connections are provided that dynamically set up the ATM switching network.

32. The ATM distributed virtual tandem switch of claim 30, in which the at least one T-IWF device converts trunks from end office switches to ATM cells.

33. The ATM distributed virtual tandem switch of claim 32, in which the at least one T-IWF device converts ATM cells to trunks for end office switches.

34. An Asynchronous Transfer Mode (ATM) distributed virtual tandem switching system comprising:

an ATM switching network comprising a plurality of ATM switches;

a first trunk inter-working function (T-IWF) device that converts trunks from end office switches to ATM cells;

a second trunk inter-working function (T-IWF) device that converts ATM cells to trunks for end office switches; and a centralized control and signaling interworking function (CS-IWF) device that performs call control functions for the plurality of ATM switches and converts between narrowband and broadband signaling for call processing and control within the ATM switching network, wherein the ATM distributed virtual tandem system functions like a standard tandem switch.

35. The ATM distributed virtual tandem switching system of claim 34, wherein each T-IWF device includes a structured circuit emulation service to emulate a circuit.

36. The ATM distributed virtual tandem switching system of claim 34, wherein individual switched virtual connections dynamically set up the ATM switching network.

37. The ATM distributed virtual tandem switching system of claim 34, in which the CS-IWF device comprises a plurality of CS-IWF devices, wherein each T-IWF device is assigned to an individual CS-IWF device.

38. An Asynchronous Transfer Mode (ATM) distributed virtual tandem switching system comprising:
- an originating end office that originates a telephone call and forwards appropriate narrowband signaling for call processing and control within an advanced intelligent network;
- a signaling transfer point that receives and forwards narrowband signaling for call processing and control within the advanced intelligent network; and
- a centralized control and signaling interworking function (CS-IWF) device that performs call control functions for a plurality of ATM switches and converts between narrowband and broadband signaling for call processing and control within an ATM switching network;
- wherein the CS-IWF device receives narrowband signaling from the signaling transfer point and processes and controls the telephone call within the ATM switching network using broadband signaling based upon the received narrowband signaling.

39. The ATM distributed virtual tandem switching system of claim 38, in which individual switched virtual connections dynamically set up the ATM switching network.

40. The ATM distributed virtual tandem switching system of claim 38, further comprising a terminating end office that is the destination of the telephone call.

41. The ATM distributed virtual tandem switching system of claim 39, further comprising the ATM switching network.

42. An Asynchronous Transfer Mode (ATM) distributed virtual tandem switching system comprising:
- an ATM switching network comprising a plurality of ATM switches;
- an originating end office that originates a telephone call;
- a terminating end office that is the destination of the telephone call;
- a first trunk inter-working function (T-IWF) device that converts trunks from end office switches to ATM cells;
- a second trunk inter-working function (T-IWF) device that converts ATM cells to trunks for end office switches;
- a signaling transfer point that receives and forwards narrowband signaling for call processing and control within an advanced intelligent network; and
- a centralized control and signaling interworking function (CS-IWF) device that performs call control functions for the plurality of ATM switches and converts between narrowband and broadband signaling for call processing and control within the ATM switching network;
- wherein the ATM distributed virtual tandem system functions like a standard tandem switch.

43. The ATM distributed virtual tandem switching system of claim 42, in which a structured circuit emulation service is provided in each T-IWF device to emulate a circuit.

44. The ATM distributed virtual tandem switching system of claim 42, in which individual switched virtual connections dynamically set up the ATM switching network.

45. The ATM distributed virtual tandem switching system of claim 42, in which the first T-IWF device and the originating end office are positioned near each other, and the second T-IWF device and the terminating end office are positioned near each other.

46. The ATM distributed virtual tandem switching system of claim 42, in which the CS-IWF device comprises a plurality of CS-IWF devices, and in which each T-IWF device is assigned to an individual CS-IWF device.

47. A call processing and control signal embodied on a carrier wave, the signal setting up a virtual connection across an ATM switching network for voice transport, the signal comprising:
- a narrowband format, transmitted from an end office via a signaling transfer point (STP) to a control and signaling interworking function (CS-IWF) [CS-IWF] device; and
- a broadband format, derived from the narrowband format, transmitted from the CS-IWF device to an originating trunk interworking function (T-IWF) device and to a destination T-IWF device via the ATM switching network.

* * * * *

UNITED STATES PATENT AND TRADEMARK OFFICE
CERTIFICATE OF CORRECTION

PATENT NO. : 6,219,348 B1
DATED : April 17, 2001
INVENTOR(S) : G. Allen, Jr. et al.

It is certified that error appears in the above-identified patent and that said Letters Patent is hereby corrected as shown below:

<u>Column 22,</u>
Line 32, after "(CS-IWF)" delete "[CS-IWF]".

Signed and Sealed this

Fifth Day of March, 2002

Attest:

JAMES E. ROGAN
*Attesting Officer*     *Director of the United States Patent and Trademark Office*